(No Model.)
J. W. LEONARD.
BICYCLE LOCK.
No. 509,175. Patented Nov. 21, 1893.
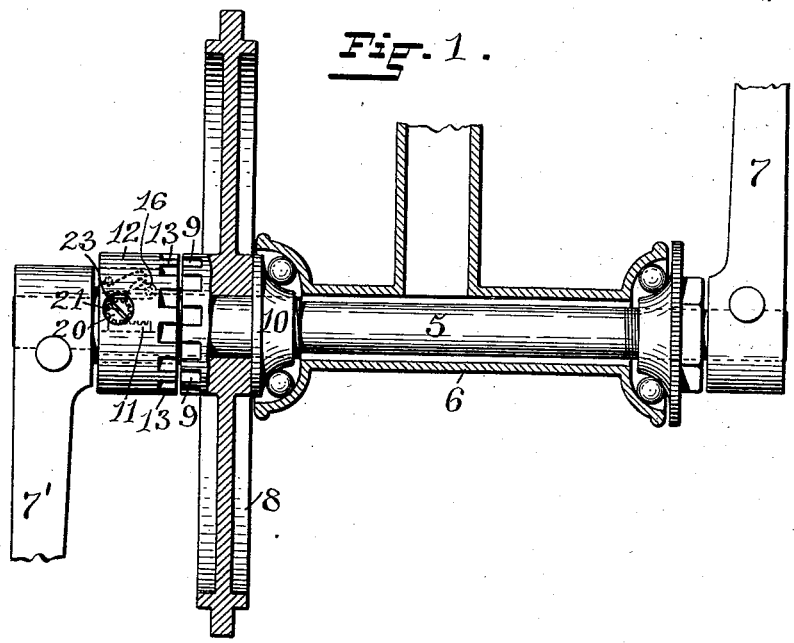
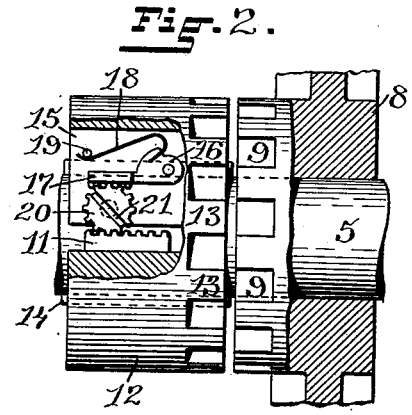
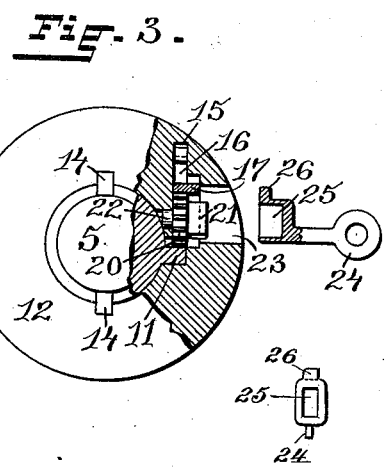
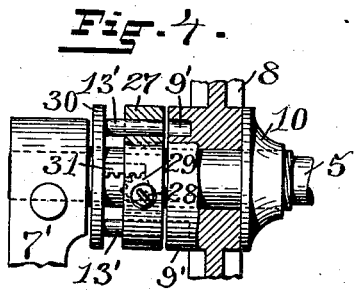
WITNESSES:
Henry J. Miller
Chas. H. Luther Jr.
INVENTOR:
John W. Leonard
by Joseph A. Miller & Co.
Attys.

UNITED STATES PATENT OFFICE.

JOHN W. LEONARD, OF CHICAGO, ILLINOIS.

BICYCLE-LOCK.

SPECIFICATION forming part of Letters Patent No. 509,175, dated November 21, 1893.

Application filed July 5, 1893. Serial No. 479,586. (No model.)

*To all whom it may concern:*

Be it known that I, JOHN W. LEONARD, of Chicago, in the county of Cook and State of Illinois, have invented certain new and useful Improvements in Bicycle-Locks, and I hereby declare that the following is a full, clear, and exact description of the same, reference being had to the accompanying drawings, forming part of this specification.

This invention has reference to improvements in devices whereby the sprocket-wheel is locked to the drive-shaft or unlocked therefrom.

The object of the invention is to so construct a bicycle-lock that by the action of unlocking the same the bicycle may be rendered inoperative from the sprocket-wheel.

Another object of the invention is to provide a new and useful bicycle-lock by means of which the sprocket-wheel is connected with or disconnected from the drive-shaft.

The invention consists in the combination with a sprocket-wheel loosely mounted on the drive-shaft, of a locking-device secured to the drive-shaft and adapted to be locked to the sprocket-wheel.

The invention also consists in the peculiar construction of the locking-device together with such other novel features of construction and combination of parts as will hereinafter be more fully described and pointed out in the claims.

Figure 1 represents a view of the drive-shaft of a bicycle with a sprocket-wheel and the improved locking-device mounted thereon. Fig. 2 represents an enlarged detail view of portions of the same, parts of the locking-clutch being broken away to show its internal construction. Fig. 3 represents an end view of the clutch and the shaft on which the clutch is carried together with the key shown in end view and partially in section. Fig. 4 represents a modified form of the locking-device and sprocket-wheel.

Similar numbers of reference designate corresponding parts throughout.

In the drawings 5 indicates the drive or crank shaft of a bicycle which is journaled in the usual manner in the sleeve 6 which is carried by the bicycle-frame. On the ends of the shaft are secured the crank-arms 7 and 7', and loosely mounted on the shaft is the hub of the sprocket-wheel 8 having clutch-cavities 9—9, the movement of this sprocket-wheel toward the sleeve 6 being limited by the flat face of the bearing-cone 10 rigidly secured to the shaft, or by any other ordinary and usual means.

Formed in part with or secured to the shaft 5, between the crank-arm 7' and the sprocket-wheel 8, is a toothed-rack 11 and keyed to this portion of the shaft, against rotation, is the clutch-sleeve 12 having the clutch-arms or pins, 13—13, the keys 14—14, however, fitting loosely into the slots of the clutch-sleeve to allow the sleeve to be reciprocated along the shaft, the arms, or pins, 13 being adapted to enter the cavities 9—9 of the sprocket-wheel hub when the sleeve 12 is advanced sufficiently toward the sprocket-wheel.

Within the clutch-sleeve 12 is formed a longitudinal cavity 15 and in the upper portion of the cavity is pivoted the pawl 16 having teeth formed on its lower edge and a ledge, or plate, 17 extending beyond the teeth. This pawl is normally depressed by the spring 18 secured to the pawl and bearing on the pin 19. The small gear 20 has the extension-plate 21 and the short shaft 22, this shaft being journaled in a transversely-extending bearing in the clutch-sleeve and the gear located between the toothed-portion of the pawl 16 and that of the rack 11.

Through the wall of the clutch-sleeve, opposite the location of the gear 20, is formed a key-hole 23 through which the key 24 may be entered, the key having a socket 25 to receive the extension 21 of the gear 20 and a finger 26 for lifting the pawl 16 out of engagement with the gear by contact with the plate 17. The socket in the key being of greater width than the diameter of the extension 21 of the gear 20, the key when entered in the keyhole may be turned sufficiently to engage the finger 26 with the plate 17 on the pawl and lift the pawl away from the gear before the sides of the socket 25 engage the extension 21 sufficiently to turn the same. Only a partial rotation of the gear 20 is required to reciprocate the clutch-sleeve 12 sufficiently to enter the arms 13—13 in the cavities 9—9, so that before the finger 26 of the key passes beyond the end of the plate 17 the securing of the sprocket to the shaft is effected. When the key is engaged with the extension of the gear 20, and the pawl 16 is lifted out of engagement with the gear, the clutch-sleeve may readily be moved along the shaft 5 to secure the sprocket-wheel thereto by means of the arms 13 and the cavities 9, or to release the sprocket-wheel from the shaft, and thus render the bicycle inoperative, the withdrawal of the key allowing the teeth of the pawl 16 to engage those of the gear and lock the same against rotation until the pawl be again raised.

In the modified form, shown in Fig. 4 of the drawings, the hub of the sprocket-wheel is provided with clutch-cavities 9'—9', and adjacent to the hub the collar 27 is secured to the shaft 5. Transversely journaled in a cavity of this collar is a shaft 28 the end of which is adapted to be engaged by a key, and mounted on this shaft, within the cavity, is a segmental-gear 29. The collar has also longitudinal perforations to allow the passage of the clutch-pins 13', these pins being secured to an annular-plate 30 which is mounted on the shaft 5 and is provided with a rack 31 the teeth of which are engaged by those of the segmental-gear 29. Thus the turning of the gear 29 will move the annular-plate 30 and the pins 13' along the shaft and throw the ends of the pins into or out of engagement with the cavities 9'.

Having thus described my invention, I claim as new and desire to secure by Letters Patent—

1. In a bicycle-lock, the combination with a drive-shaft, a sprocket-wheel loosely mounted thereon, a clutch-sleeve reciprocally keyed to the shaft and furnished with a cavity and a laterally-extending entrance to the cavity, of a reciprocating-mechanism and a locking-device contained within the cavity, and a key for successively operating the locking-device and reciprocating-mechanism.

2. In a bicycle-lock, the combination with a drive-shaft, and a sprocket-wheel, having friction-cavities in the hub thereof, loosely mounted on the shaft, of a sleeve reciprocally keyed to the shaft and having clutch-pins and an internal-cavity, a rack secured to the drive-shaft within this cavity, a gear transversely journaled in the sleeve and engaging the rack, and a locking-device for locking the gear from rotation.

3. The combination with the shaft 5, and the sprocket-wheel 8 loosely mounted thereon, the hub of which is provided with the cavities 9—9, of the rack 11 secured to the shaft, the sleeve 12 having the pins 13, the cavity 15 and key-hole 23, reciprocally keyed to the shaft 5, the gear 20, having the extension 21 and shaft 22 journaled in said cavity, the toothed-pawl 16 having the ledge, or plate, 17 pivoted in the cavity above the gear, the spring 18 for depressing the pawl, the key 24, having the end-socket 25, adapted to loosely fit the extension 21 and the finger 26 for operating the block, as described.

In witness whereof I have hereunto set my hand.

JOHN W. LEONARD.

Witnesses:
JOSEPH A. MILLER, Jr.,
M. F. BLIGH.